United States Patent
Zeller et al.

[11] Patent Number: 6,073,740
[45] Date of Patent: Jun. 13, 2000

[54] PROCESS FOR TUNING THE SWITCHING STATE OF A TORQUE CONVERTER LOCK-UP CLUTCH IN AN AUTOMATIC GEAR BOX

[75] Inventors: Heinrich Zeller, Friedrichshafen; Friedemann Jauch, Meckenbeuren, both of Germany

[73] Assignee: ZF Friedrichshafen AG, Friedrichshafen, Germany

[21] Appl. No.: 09/214,396
[22] PCT Filed: Jul. 19, 1997
[86] PCT No.: PCT/EP97/03893
§ 371 Date: Dec. 31, 1998
§ 102(e) Date: Dec. 31, 1998
[87] PCT Pub. No.: WO98/04852
PCT Pub. Date: Feb. 5, 1998

[30] Foreign Application Priority Data

Jul. 26, 1996 [DE] Germany .......................... 196 30 300

[51] Int. Cl.[7] .................................................. F16H 61/14
[52] U.S. Cl. ...................... 192/3.31; 192/103 C; 701/67
[58] Field of Search ............................. 192/3.31, 103 C; 74/731.1, 732.1; 477/64, 65, 169, 175, 176; 701/67

[56] References Cited

U.S. PATENT DOCUMENTS

| | | | |
|---|---|---|---|
| 4,691,812 | 9/1987 | Takazawa | 192/3.3 |
| 4,730,709 | 3/1988 | Kawata et al. | 192/3.31 |
| 5,277,287 | 1/1994 | Ishii et al. | 192/3.31 |
| 5,325,946 | 7/1994 | Kashiwabara et al. | 192/3.31 |
| 5,480,363 | 1/1996 | Matsubara et al. | 477/63 |
| 5,816,979 | 10/1998 | Shiiba et al. | 477/176 |
| 5,935,043 | 8/1999 | Watanabe et al. | 477/169 |

FOREIGN PATENT DOCUMENTS

| | | |
|---|---|---|
| 0 405 437 A1 | 1/1991 | European Pat. Off. . |
| 44 07 951 A1 | 9/1995 | Germany . |
| 44 13 171 A1 | 10/1995 | Germany . |

OTHER PUBLICATIONS

*ATZ Automobiltechnische Zeitschrift* 96 (1994) 11, by Ferit Küçükay and Christian Bock, pp. 690–697.

*Primary Examiner*—Richard M. Lorence
*Attorney, Agent, or Firm*—Davis and Bujold

[57] ABSTRACT

A process for tuning the switching state of a torque converter lock-up clutch (WK) in an automatic transmission to the output speed of rotation ($n\_ab$) of the transmission output shaft or the wheel speeds of rotation ($n\_wheel$) of driving wheels of a vehicle by means of an electronic transmission controller (EGS) with computer unit and an electronic pressure regulator (EDS) includes the following steps:

a) from the wheel speeds of rotation ($n\_wheel$) measured by a measurement device (1) on the driving wheels, or the output speed of rotation ($n\_ab$) of the transmission output shaft, a time-related gradient of speed of rotation ($dn/dt$) is detected during activated state of the torque converter lock-up clutch by the computer unit in a processing function (S3);

b) in a discriminating function (S4) is checked whether the amount of the gradient of speed of rotation ($dn/dt$) is higher than a threshold value ($GW\_1$) and in the affirmative, a processing function (S6) is started for quick opening of the activated torque converter lock-up clutch (WK);

c) in a discriminating function (S8) is checked whether a presettable interrupt criterion has been satisfied and in the affirmative a processing function (S9) is started for return to a main program, in the negative, a branching off in the processing function (S6) is effected for quick opening of the activated torque converter lock-up clutch (WK).

5 Claims, 3 Drawing Sheets

PROCESS FOR TUNING THE SWITCHING STATE OF A TORQUE CONVERTER LOCK-UP CLUTCH IN AN AUTOMATIC GEAR BOX

The invention relates to a process for tuning the switching state of a converter lock-up clutch (WK), in an automatic transmission, to the output speed of rotation of the output shaft or the speed of rotation of the driving wheels of a vehicle by means of an electronic controller (EGS), with a computer unit, and an electric pressure regulator (EDS).

BACKGROUND OF THE INVENTION

Already known from the practice are motor vehicles having automatic transmission torque converter lock-up clutches which can be operated in an "opened" or "activated" state. The "activated" state comprises of the regulated slipping and closed state.

Such a torque converter lock-up clutch has been described, for example, in ATZ Automobiltechnische Zeitschrift 96 (1994) 11. The most important input variables for the regulator of said known torque converter lock-up clutch are the engine speed of rotation and the turbine speed of rotation. By subtraction of those two input variables, the torque converter slip is computed as the regulating variable. The command variable WK nominal slip is laid down in a performance graph in an electronic transmission controller (EGS).

An electric pressure regulator (EDS) serves the actuator for the pressure control of said torque converter lock-up clutch, which, in turn, is controlled by the electronic transmission controller (EGS) via a current-regulated final step. The EDS converts the preset control current according to its characteristic line to a proportional hydraulic pressure. By said EDS, for example, in a 2-line torque converter with two control valves, both the torque converter pressure, which acts upon the rear side of the torque converter clutch piston, and the torque converter clutch pressure which closes the torque converter clutch piston, are controlled.

The torque converter lock-up clutch is designated as "open" or "opened" when no torque is transmitted via the torque converter lock-up clutch.

In an "activated" state the piston of the torque converter lock-up clutch is loaded with pressure. One or more friction disc(s) are compressed by the resulting piston force and a corresponding transmission torque is produced.

In the so-called "quick opening" of the torque converter lock-up clutch, the torque transmitted by the torque converter lock-up clutch is quickly broken down to low values (for example, <50 Nm) or the torque converter lock-up clutch is completely opened.

Together with the usual control functions, said torque converter lock-up clutch has different special functions in order to optimize the properties.

Thus, in this torque converter lock-up clutch, a process is known in which the torque converter lock-up clutch is always open below a threshold temperature, and in which during the warm up the nominal slip is raised in comparison with the normal operation.

By another control process, the operation of the torque converter lock-up clutch is eliminated during very elevated transmission temperatures in order to protect the friction areas against overheating.

In addition, a process for quick filling is known where the piston of the torque converter lock-up clutch, in the transition from open to regulated state, is moved to the regulating position.

By another switching process, the operation of the torque converter lock-up clutch is maintained even during a gearshift in order to prevent a high rotation of the engine wherein the nominal slip is raised during a gearshift.

However, certain driving situations are not correctly detected by the known torque converter lock-up clutch and the electronic transmission controller thereof, resulting in the known torque converter lock-up clutch remaining, for example, "activated" even though it should have been opened.

Such a driving situation is the spinning of the driving wheels of a vehicle on a smooth ground, while the torque converter lock-up clutch is activated, and the subsequent transition to a ground of high frictional value. When the driving wheels spin, in the known torque converter lock-up clutches, a switch is made to a next higher gear. When the driving wheels again contact the rough ground, they are abruptly decelerated, but because of the spinning of the driving wheels too high of a gear has been switched in by the automatic transmission with the known activated torque converter lock-up clutch. That situation can result in the engine becoming stalled from the rigid through drive between the input and the wheels, and thus ensues a drive situation critical to safety.

Therefore, the problem on which this invention is based is to make available a process by which the state of a torque converter lock-up clutch in an automatic transmission is tuned to the quick deceleration of the driving wheels of a vehicle.

SUMMARY OF THE INVENTION

The process according to the invention offers the advantage that by virtue of the constant finding of the time-related gradient of the speed of rotation when the torque converter lock-up clutch is activated, a quick deceleration of the driving wheels of a vehicle is immediately detected and thereby, the above mentioned quick opening of the torque converter lock-up clutch is released. In the quick opened state of the torque converter lock-up clutch the strong deceleration or absolute stalling of the engine that otherwise occurs is prevented.

BRIEF DESCRIPTION OF THE DRAWING(S)

Other advantages of the invention result from the sub-claims and the description of the invention that follows with reference to the basic drawing. The drawing shows:

FIG. 1 is a flow chart of a process for tuning the switching state of a torque converter lock-up clutch to the output speed of rotation of the transmission output shaft or the wheel speeds of rotation of the driving wheels of a vehicle;

FIG. 2 is a flow chart of one other process for tuning the switching state of a torque converter lock-up clutch to the output speed of rotation of the transmission output shaft or the wheel speeds of rotation of driving wheels of a vehicle; and FIG. 3 is a diagram with the curve of the output speed of rotation n_ab and of the current of the torque converter lock-up clutch (WK) in the course of time in a quick opening of the torque converter lock-up clutch according to the process of FIG. 1 or 2.

DESCRIPTION OF THE PREFERRED EMBODIMENT(S)

Figure 1:
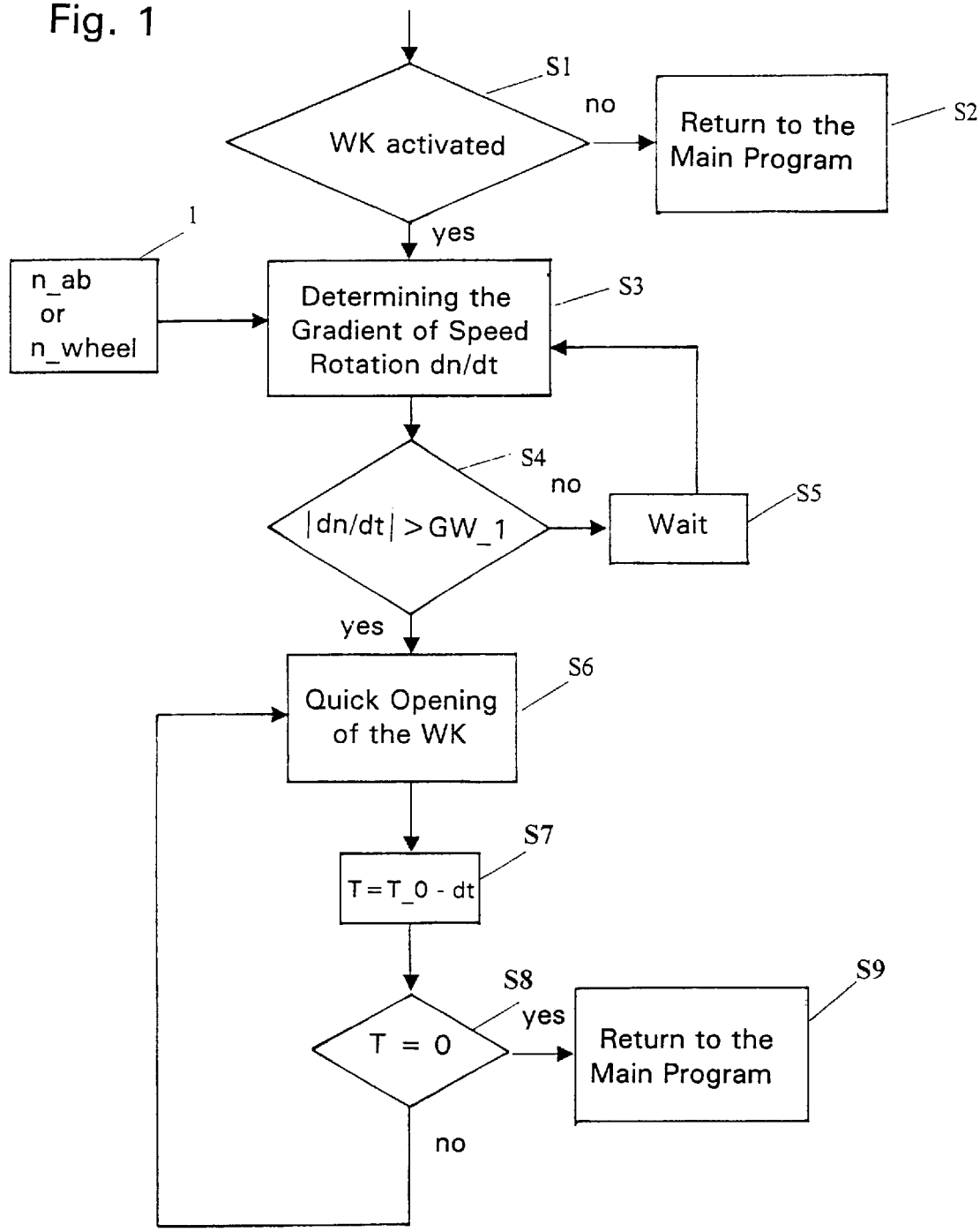

Referring to FIG. 1, a process sequence plan is shown for a sub-program for tuning the switching state of a torque converter lock-up clutch (WK) in an automatic transmission to the output speed of rotation n_ab of the transmission output shaft or the wheel speeds of rotation n_wheel of the driving wheels of a vehicle.

The working of said sub-program can be interrupted at any time by tasks of higher priorities. It will continue on in the same place. A "holding pattern" is treated in the same way.

At the beginning, in a first discriminating function S1, checked is whether the torque converter lock-up clutch is activated. Should this not be the case, the program branches off for return to a main program in a processing function S2. But if the torque converter lock-up clutch is activated, the discriminating function S1 activates a processing function S3 which determines a time-related gradient of the speed of rotation (dn/dt) from speeds which are given by a measurement device 1 to the processing function S3. The speeds of rotation can be either the wheel speeds of rotation n_wheel measured on driving wheels (not shown) of a vehicle, or alternatively the output speed of rotation n_ab of the transmission output shaft also (not shown). The gradient of the speed of rotation (dn/dt) is slidingly found, that is, it constitutes a medium value from an actual computer gradient of the speed of rotation and one or more gradients of the speed of rotation determined at very short intervals. The gradient of the speed of rotation thus determined, which is the differential quotient according to the function (n_ab(t2)−n_ab(t1))/(t2−t1) involving the output speeds of rotation (n_ab), and since computed by the computer unit of the electronic transmission controller, constitutes a reliable value.

The gradient of the speed of rotation (dn/dt) is given by the processing function S3 to a subsequent discriminating function S4, which checks whether the amount of the gradient of the speed of rotation (dn/dt) is higher than a preset first threshold value GW_1.

If the result of the inquiry of the discriminating function S4 is negative, the program branches off to the waiting function S5 and a holding pattern is run through until the discriminating function S4 detects a gradient of the speed of rotation (dn/dt) which is higher than the threshold value GW_1.

If the result of the inquiry of the discriminating function S4 is positive, that is, the amount of the gradient speed of rotation (dn/dt) is higher than the threshold value GW_1, a subsequent processing function S6 is started for the quick opening of the torque converter lock-up clutch, whereby the electric pressure regulator (EDS) is controlled by the electronic transmission controller (EGS) in a manner, such that, the current for control of the torque converter lock-up clutch is set leap-like or in a short time (t=1 sec) to those values at which the torque transmitted to the torque converter lock-up clutch by friction is light, that is, within a range of from 0 to 50 Nm. It obviously is also possible to select the current value so that the torque converter lock-up clutch can be completely opened.

Figure 3A:
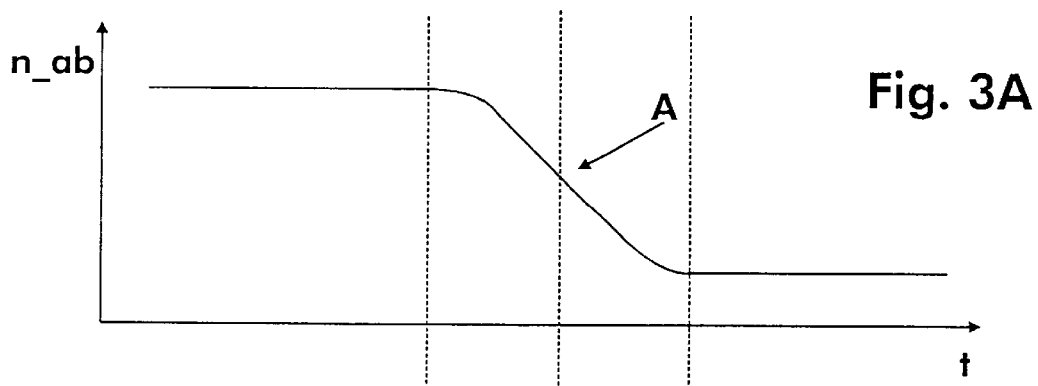
Figure 3B:
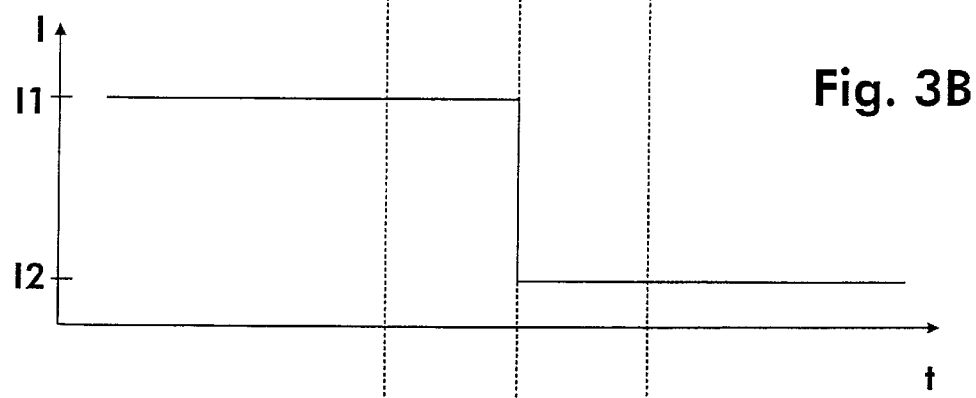
Figure 3C:
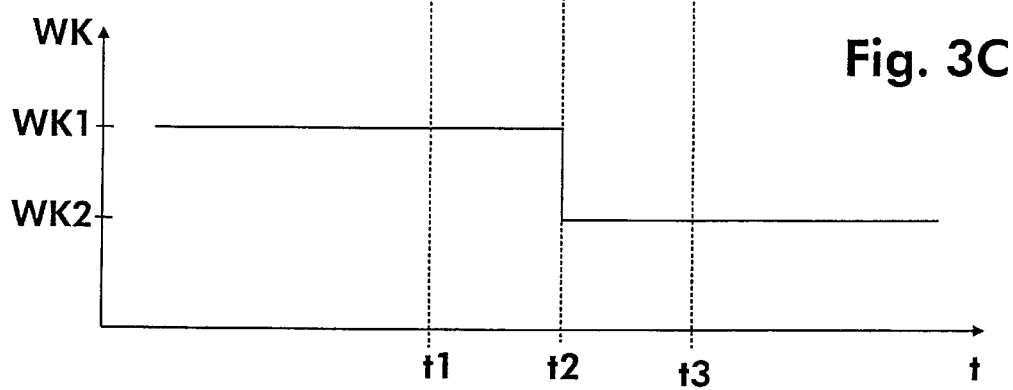

FIG. 3 consists of the partial FIGS. 3A to 3C. FIG. 3A shows the curve of the output speed of rotation n_ab in the course of time, FIG. 3B the current value given by the electronic transmission controlled, and FIG. 3C the state of the torque converter lock-up clutch in the course of time. In the time period of up to t1, it is assumed that the driving wheels of the vehicle spin on smooth ground so that the output speed of rotation is at a high level. It is further assumed that the torque converter lock-up clutch is in an "activated" state. An "activated" state means that the clutch is either regulatedly slipping or closed. In FIG. 3C, this state is designated on the ordinate with WK1. The corresponding current value is designated with I1 in FIG. 3B. At the point in time t1 the driving wheels come to adhesive ground, thereby the output speed of rotation begins to change toward lower values, that is, the driving wheels are decelerated. At the point in time t2, the amount of the gradient of the speed of rotation of the output speed of rotation is higher than the threshold value 1, point A. As the gradient of the speed of rotation appears, the current value decreases from the first level I1 to a second level I2, FIG. 3B. Thereby the state of the torque converter lock-up clutch changes in a manner such that it passes from the activated state WK1 to the second state WK2. The state WK2 can be selected so that the torque converter lock-up clutch still transmits only a light torque such as <50 Nm. Obviously, it is possible to also completely open the torque converter lock-up clutch. At the point A, according to FIG. 3A, the quick opening of the torque converter lock-up clutch is thus released. In the time period t2 to t3, the driving wheels are further decelerated. At the point in time t3, it is assumed that the driving wheels adhere again.

This quickly opened state of the torque converter lock-up clutch is maintained until a presettable interrupt criterion is satisfied. For this purpose, it is checked whether in a subsequent discriminating function S8 the preset interrupt criterion has been satisfied. If this is the case, there follows a branching off to a processing function S9 for a return to the main program wherein the torque converter lock-up clutch is again activated, that is, closed or switched to the regulated state, in case the above has been thus preset by the main program.

If the interrupt criterion has not been satisfied, the processing function S6 is returned to for a quick opening of the torque converter lock-up clutch and thus, the quickly opened state of the torque converter lock-up clutch is maintained.

In particular, referring to FIG. 1, the interrupt criterion represent the expiration of a predefined time (T) which in a processing function S6 has been started for a quick opening of the subsequent processing function S7 of the torque converter lock-up clutch. The predefined time T is a time step formed in a manner such that from an initial value T_O a time period dt of a current time t is drawn. Mathematically considered, the predefined time T thus constitutes the difference of an initial value T_O minus the time period dt.

In the embodiment of FIG. 1, in the discriminating function S8, it is checked, as interrupt criterion, whether the predefined time T now equals the value O, that is, that the time step has reached the end value of zero. When the time T has expired, this means that to return to the main program a branching off is effected in the processing function S9, but in case where the time T still has not expired, the processing function S6 is returned to and the torque converter lock-up clutch remains quickly opened.

Figure 2:
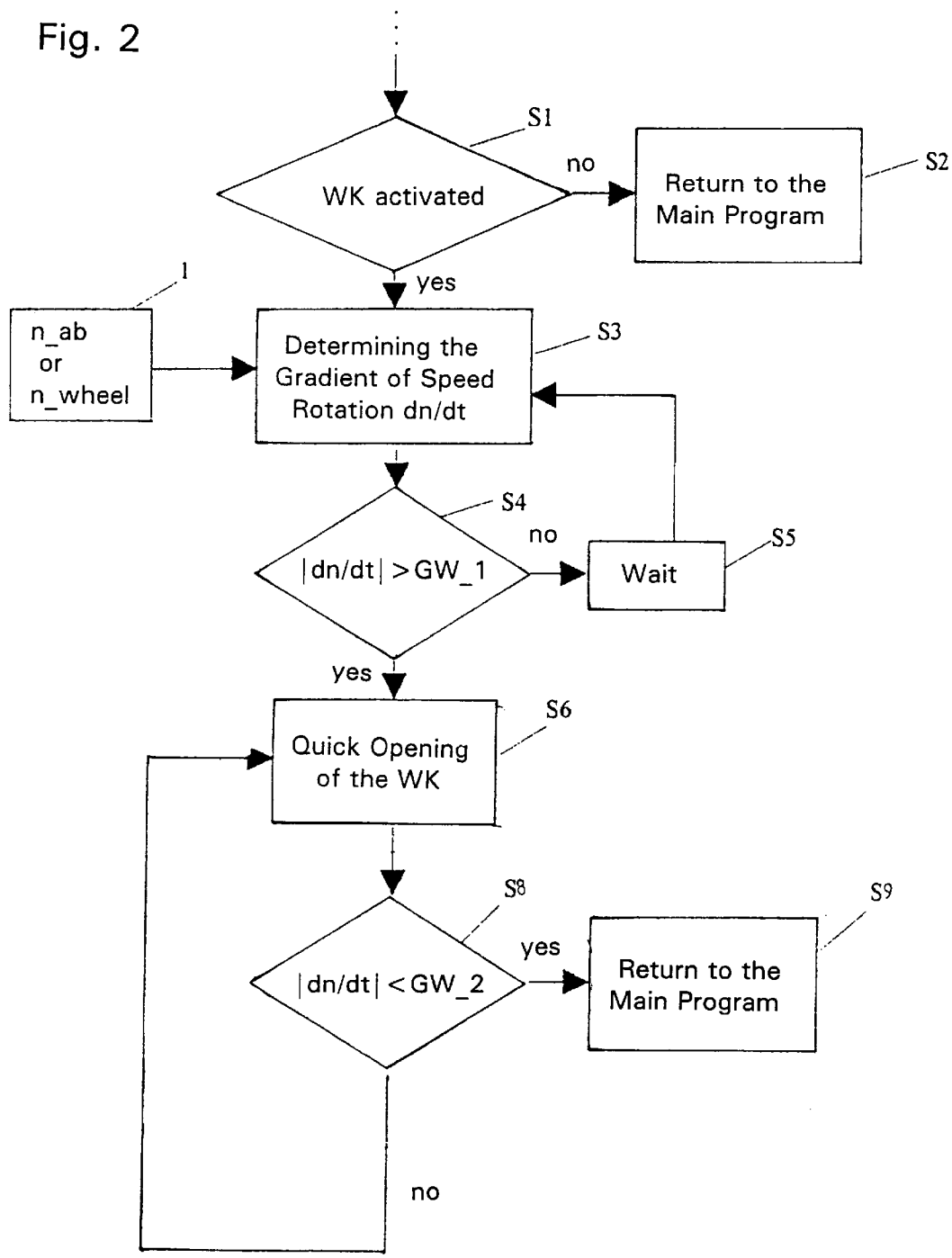

In the embodiment illustrated in FIG. 2, the interrupt criterion is defined so that the discriminating function S8 detects the interrupt criterion as having been satisfied when the amount of the gradient of the speed of rotation (dn/dt) is less than a second predefined threshold value GW_2. If the amount of the gradient of the speed of rotation is above the threshold value GW_2, the torque converter lock-up clutch remains in a quickly opened state by a return to the processing function S6. If on the contrary, the discriminating function S8 delivers the result that the amount of the gradient of the speed of rotation (dn/dt) is less than the second threshold value GW_2, the processing function S9 is started for a return to the main program.

| Reference numerals |
|---|
| 1 measurement device |
| S1 discriminating function |
| S2 processing function |
| S3 processing function |
| S4 discriminating function |
| S5 waiting function |
| S6 processing function |
| S7 discriminating function |
| S8 processing function |
| S9 processing function |

What is claimed is:

1. A process for controlling a torque converter lock-up clutch (WK) of an automatic transmission comprising the steps of:

adjusting initiation of slip (S6) of the torque converter lock-up clutch (WK) relative to a speed of rotation of an output shaft of the automatic transmission by using an electronic transmission controller to determine a gradient of the speed of rotation (dn/dt);

detecting a significant deceleration when the gradient of the speed of rotation (dn/dt) exceeds a first threshold value (|dn/dt|); and facilitating the quick opening (S6) of the torque converter lock-up clutch (WK) in response to the significant deceleration so that the torque converter lock-up clutch (WK), initially in a closed or regulated slipping state, has a reduced engaging force and effects a lower transmissible torque preventing at least one of a rapid deceleration and stalling of the engine.

2. The process according to claim 1, comprising deactivating the quick opening function (S6) when an interrupt criterion (S8) is detected, the interrupt criterion (S8) existing when the significant deceleration falls below a second threshold value (GW_2) (dn/dt<GW_2).

3. The process according to claim 2, comprising determining the gradient of the output speed of rotation by the electronic transmission controller according to the function (n(t2)−n(t1))/(t2−t1).

4. The process according to claim 2, comprising using an average value from an actual gradient of the speed of rotation and at least the gradient of the speed of rotation last detected to represent the gradient of the output speed of rotation (dn/dt).

5. The process according to claim 1, comprising tuning the quick opening (S6) of the torque converter lock-up clutch (WK) to the speed of rotation of a wheel of a vehicle by using the electronic transmission controller to determine the gradient of the speed of rotation (dn/dt) of the wheel.

* * * * *